Nov. 2, 1948.  H. A. PETERSON  2,452,954

NETWORK ANALYSER APPARATUS

Filed Oct. 3, 1947

Inventor:
Harold A. Peterson,
by Crowell & Mack
His Attorney.

Patented Nov. 2, 1948

2,452,954

UNITED STATES PATENT OFFICE 2,452,954

NETWORK ANALYZER APPARATUS

Harold A. Peterson, Madison, Wis., assignor to General Electric Company, a corporation of New York Application October 3, 1947, Serial No. 777,720

5 Claims. (Cl. 171—97)

My invention relates to apparatus for use in an A. C. network analyzer in the study of electric power systems, and more particularly to such apparatus adapted to simulate the action of a phase-shifting transformer.

In setting up on a network analyser a representation of an electric power system, a difficulty arises in that no simple electric network has been found which will adequately simulate the action of a phase-shifting transformer. A four terminal network is needed having characteristics such that fixed relationships exist between input and output voltages both as to amplitude and as to phase, and such that real power input equals real power output and reactive power input equals reactive power output in the network. One solution to this problem has been to use two separate network analyser generator units to represent respectively the input and output of the phase-shifting transformer, and to readjust the phase and amplitude of the output voltage of each such generator unit at each step of the power system study until the proper relationships were obtained. Such adjustments are tedious and time-consuming; hence this solution is unsatisfactory. The object of my invention is to provide apparatus to simulate the action of a phase-shifting transformer in which necessary readjustments can be performed quickly, and if desired can be made automatically.

Figure 1:
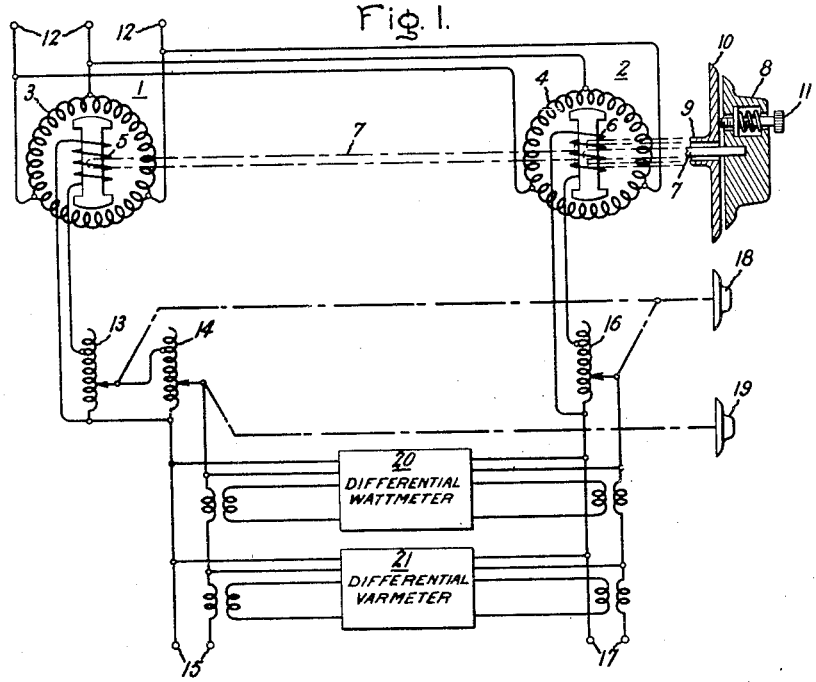
Figure 2:
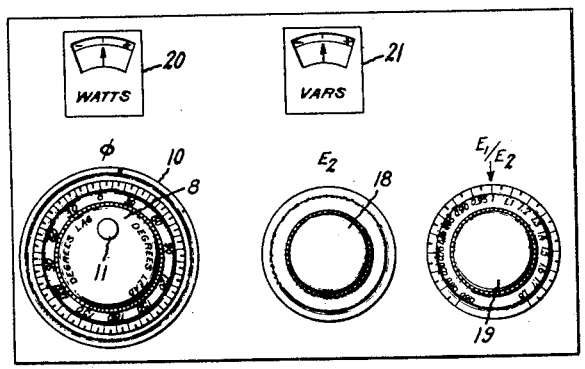
Figure 3:
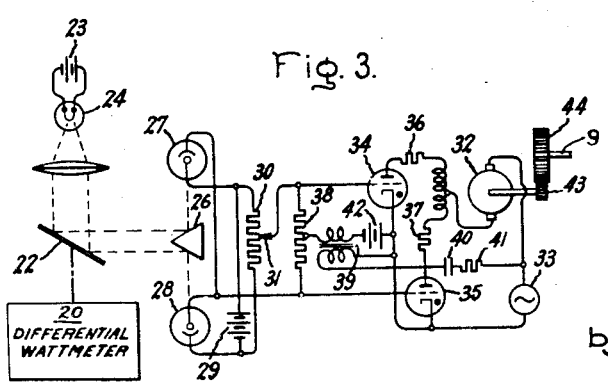

The features of my invention which are believed to be novel and patentable will be pointed out in the claims appended hereto. For a better understanding of my invention reference is made in the following description to the attached drawing in which Fig. 1 is a schematic diagram of a preferred form of my apparatus, Fig. 2 is an elevation of the control panel of my apparatus, and Fig. 3 is a schematic diagram of a follow-up mechanism adapted to be used in my apparatus. Similar reference characters refer to similar parts throughout the drawing.

Referring now to Fig. 1 of the drawing, two Selsyn generators 1 and 2, of the type used in network analysers, each have stator and rotor elements including respectively three-phase stator windings 3 and 4 and single-phase rotor windings 5 and 6, as shown. A shaft 7 and a control member 8, comprising a control knob and a dial attached thereto, are adapted to rotate the rotor of Selsyn generator 1. A hollow shaft 9, fitting axially over shaft 7, and a dial 10 attached thereto are adapted to rotate the rotor of Selsyn generator 2. A friction lock 11 is provided so that member 8 and dial 10 can be locked together, so that member 8 rotates both rotors simultaneously by equal amounts; or unlocked so that member 8 rotates the rotor of Selsyn generator 1 only, without like rotation of the rotor of Selsyn generator 2.

Three-phase windings 3 and 4 are connected in parallel to terminals 12, through which they may be energized with three-phase alternating current from the common electric supply of the network analyser. Single-phase winding 5 is connected to a variable ratio autotransformer 13, the output of auto transformer 13 is connected to another variable ratio auto transformer 14, and the output of auto transformer 14 is connected to electric terminals 15, as shown, so that an alternating terminal voltage is obtained across terminals 15 having a fixed phase relationship to the voltage induced in winding 5, and having an amplitude which is variable responsive to the action of autotransformers 13 and 14. Single-phase winding 6 is connected to a variable ratio auto transformer 16 and the output of autotransformer 16 is connected to electric terminals 17, so that an alternating terminal voltage is obtained across terminals 17 having a fixed phase relationship to the voltage induced in winding 6, and having an amplitude which is variable responsive to the action of auto transformer 16. Auto transformers 13 and 16 are ganged together and connected to control member 18, as shown conventionally by broken lines in Fig. 1, so that member 18 is adapted to adjust both autotransformers simultaneously and thus to vary the absolute amplitudes of both terminal voltages simultaneously by equal ratios. Auto transformer 14 is connected to be controlled by member 19 so that member 19 is adapted to vary the amplitude of the voltage across terminals 15 without affecting the voltage across terminals 17, thus changing the relative amplitudes of the two terminal voltages, one to the other. Electric terminals 15 and 17 are connected to the electric network set up on the network analyser, and represent the input and output terminals respectively of the simulated phase-shifting transformer. Other voltage transforming devices may be used in place of the auto transformers specified and will also give good results.

A differential wattmeter 20, connected as shown, is adapted to indicate a difference between the real power input flowing into one pair of the electric terminals and the real power output flowing out of the other pair of terminals. A differential varmeter 21 is adapted to indicate a like difference between the reactive power input and output. Since the required conditions are that input and output powers, both real and reactive, be equal, only the zero positions of these meters need be accurately calibrated.

Fig. 2 of the drawing is an elevation of the control panel of my apparatus, showing the meters and control members. Dial 10 is provided with an arrow or indicator line, and the dial of control member 8 is calibrated in degrees lead and degrees lag, as shown. In using my apparatus to represent a phase-shifting transformer, an initial adjustment is to unlock friction lock 11 and rotate member 8 until its dial, in cooperation with the arrow on dial 10, indicates the amount of phase-shift performed by the simulated phase-shifting transformer. This adjusts the phase of the two terminal voltages to the proper relationship, one to the other. Member 8 and dial 10 are now locked together with friction lock 11, so that this phase relationship will be maintained throughout the following adjustments. The dial of control member 19 is calibrated to indicate, in cooperation with an arrow or indicator line on the panel, the ratio of output to input voltage of the simulated transformer. An initial adjustment is to adjust member 19 to the proper voltage ratio.

Only two of the original four required conditions remain to be satisfied during each step of the power system study. Real power input must equal real power output. A difference between these powers will be indicated by differential wattmeter 20, and in general they may be balanced by varying the phase of both terminal voltages simultaneously by equal amounts. This may be done by rotation of a single control member 8, since after the initial adjustments are completed member 8 remains locked to dial 10 and the two rotate together. Also reactive power input must equal reactive power output. A difference between these powers will be indicated by differential varmeter 21, and in general they may be balanced by varying the amplitudes of both terminal voltages simultaneously by equal ratios. This may be done by rotation of a single control member 18. Thus there are only two control members to be manipulated to achieve a power balance.

By reducing the number of adjustments to be made at each step of the power system study and the number of conditions to be satisfied from four adjustments and four conditions to two adjustments and two conditions, my apparatus greatly simplifies the use of a network analyser to study power systems containing phase-shifting transformers. If a further reduction in the number of manual adjustments is desired, a follow-up mechanism such as is shown in Fig. 3, or an equivalent device responsive to the indication of wattmeter 20, may be used to position member 8, and a similar follow-up mechanism responsive to the indication of varmeter 21 may be used to position member 18. Thus all adjustments, except the two initial adjustments, can be made automatically.

Referring to Fig. 3, a follow-up mechanism is shown in which a mirror 22 is adapted to be rotated responsive to changes in the indication of differential wattmeter 20, the mirror and the rotating elements of the wattmeter being attached to a common shaft, as is shown conventionally by a broken line in Fig. 3. A battery 23 and an electric lamp 24 produce a light beam which is collimated by a lens 25 and reflected by mirror 22 onto a divided mirror or beam-splitter 26, whereupon the beam is divided into two portions which impinge respectively upon two phototubes 27 and 28, as shown. Phototubes 27 and 28 are connected as a voltage divider across a battery 29 or other voltage source. A resistor 30 having a variable tap 31 provides a second voltage divider which is also connected across battery 29.

A split-field direct-current electric motor 32 is connected through gears 43 and 44 to shaft 9, and is adapted to rotate the shaft. Motor 32 is driven by alternating-current electric source 33 and two thyratron rectifiers 34 and 35, connected as shown. Resistors 36 and 37 are provided in the plate circuits of the thyratrons to limit the magnitude of transient current surges, and a center-tapped resistor 38 is provided connecting the thyratron grids as shown. Electric source 33 provides an alternating voltage at the plates of the thyratrons, and acting through transformer 39 and phase-shifting capacitor 40 and resistor 41 provides an alternating voltage at the grids of the thyratrons which lags 90 degrees behind the voltage at their plates. A battery 40, or other suitable means, is provided to bias the thyratron grids so that when the grid voltage of the two tubes are balanced the thyratrons conduct electric current only during the peak positive cycle of grid voltage, or alternatively are biased just to cut-off. Under these conditions equal and oppositely directed currents flow through the two halves of the split-field winding of motor 32, so the motor does not rotate.

Tap 31 is adjusted so that when the indication of differential wattmeter 20 is zero, showing that real power input flowing into my apparatus equals real power output flowing out, the voltage at the grid of thyratron 34 equals the voltage at the grid of thyratron 35, both thyratrons conduct equally, and motor 32 does not rotate. If the real power input and output become unbalanced, wattmeter 20, responsive to such unbalance, rotates mirror 22 slightly so that the relative amounts of light impinging respectively upon phototubes 27 and 28 change, whereby the relative resistances of the two phototubes change. This changes the grid voltage of thyratron 35 so that the two thyratrons no longer conduct equally, more current flows through one-half of the split-field winding of motor 32 than flows through the other half of the split-field winding, and motor 32 rotates. This in turn rotates shaft 9 in the proper direction to correct the unbalance until the real power input again equals the real power output, as has been hereinbefore explained.

A similar follow-up mechanism may be used to automatically adjust control member 18. Such mechanism differs from that shown in Fig. 3 only in that mirror 22 is rotated responsive to changes in the indication of varmeter 21 instead of to changes in the indication of wattmeter 20, and gear 44 is connected through a shaft to member 18 instead of being connected to shaft 9.

In accordance with the patent statutes I have described the principle of my invention together with the apparatus which I now consider to represent the best embodiment thereof, but I wish it to be understood that the apparatus shown is only illustrative and that the invention may be carried out by other means.

What I claim as new and desire to secure by Letters Patent of the United States is:

1. Apparatus for use in a network analyser, adapted to be connected through input and output electric terminals to an electric network set up on the analyser, to simulate the action of a phase-shifting transformer, comprising two Selsyn generators, each having a three-phase winding and a single-phase winding relatively rotatable thereto, means to excite the two three-phase windings with alternating currents having a frequency determined by the operating frequency of the analyser and constant phase relationships to each other and to the primary current supply of the analyser, so that voltages are induced in the two single-phase windings having a like frequency and a phase relationship determined by the respective angular positions of the single-phase windings, means to rotate the single-phase winding of one Selsyn generator relative to its three-phase winding without like rotation of the single-phase winding of the other Selsyn generator, means including a single control member to rotate the single-phase windings of both Selsyn generators simultaneously by equal amounts relative to their respective three-phase windings, means to provide an alternating voltage across the input terminals having constant phase and frequency relationships to the voltage induced in the single-phase winding of one Selsyn generator, means to provide an alternating voltage across the output terminals having constant phase and frequency relationships to the voltage induced in the single-phase winding of the other Selsyn generator, means to vary the amplitude of the voltage across the input terminals relative to the amplitude of the voltage across the output terminals, means including a single control member to vary the absolute amplitudes of both the voltage across the input terminals and the voltage across the output terminals simultaneously by equal ratios, means to indicate a difference between the real power input flowing into the input terminals and the real power output flowing out of the output terminals, and means to indicate a difference between the reactive power input flowing into the input terminals and the reactive power output flowing out of the output terminals.

2. Apparatus for use in a network analyser comprising two pairs of electric terminals, two Selsyn generators each having rotor and stator elements including respectively a three-phase winding and a single-phase winding, means to rotate one Selsyn rotor relative to the other Selsyn rotor, means including a single control member to rotate both Selsyn rotors simultaneously by equal amounts, means to excite the two three-phase windings from a common three-phase electric source so that voltages are induced in the two single-phase windings having phase relationships determined by the respective angular positions of the two Selsyn rotors, means to provide an alternating terminal voltage across one pair of electric terminals having a fixed phase relationship to the voltage induced in one single-phase winding, means to provide an alternating terminal voltage across the other pair of electric terminals having a fixed phase relationship to the voltage induced in the other single-phase winding, voltage transforming means to vary the relative amplitudes of the two terminal voltages one to the other, and voltage transforming means including a single control member to vary the absolute amplitudes of both terminal voltages simultaneously by equal ratios.

3. Apparatus for use in a network analyser comprising in combination apparatus as in claim 2, a differential wattmeter connected to indicate a difference betwen the real power input flowing into one pair of the electric terminals and the real power output flowing out of the other pair of the electric terminals, and a differential varmeter connected to indicate a difference between the reactive power input flowing into one pair of the electric terminals and the reactive power output flowing out of the other pair of the electric terminals.

4. Apparatus for use in a network analyser comprising two pairs of electric terminals, two Selsyn generators each having rotor and stator elements including respectively a three-phase winding and a single-phase winding, means to rotate one Selsyn rotor relative to the other Selsyn rotor, a differential wattmeter responsive to a difference between the real power input flowing into one pair of the electric terminals and the real power output flowing out of the other pair of the electric terminals, a follow-up mechanism responsive to the action of such wattmeter adapted to rotate both Selsyn rotors simultaneously by equal amounts until said real power input equals said real power output, means to excite the two three-phase windings from a common three-phase electric source so that voltages are induced in the two single-phase windings having phase relationships determined by the respective angular positions of the two Selsyn rotors, means to provide an alternating terminal voltage across one pair of the electric terminals having a fixed phase relationship to the voltage induced in one single phase winding, means to provide an alternating terminal voltage across the other pair of the electric terminals having a fixed phase relationship to the voltage induced in the other single-phase winding, voltage transforming means to vary the relative amplitudes of the two terminal voltages one to the other, a differential varmeter responsive to a difference betwen the reactive power input flowing into one pair of the electric terminals and the reactive power output flowing out of the other pair of the electric terminals, and voltage transforming means cooperating with a follow-up mechanism responsive to the action of such varmeter adapted to vary the absolute amplitudes of both terminal voltages simultaneously by equal ratios until said reactive power input equals said reactive power output.

5. Apparatus for use in a network analyser comprising two pairs of electric terminals, two Selsyn generators each having rotor and stator elements including respectively a three-phase winding and a single-phase winding, means to rotate one Selsyn rotor relative to the other Selsyn rotor, means including a single control member to rotate both Selsyn rotors simultaneously by equal amounts, means to excite the two three-phase windings from a common three-phase electric source so that voltages are induced in the two single-phase windings having phase relationships determined by the respective angular positions of the two Selsyn rotors, means to provide an alternating terminal voltage across one pair of electric terminals having a fixed phase relationship to the voltage induced in one single-phase winding, means to provide an alternating terminal voltage across the other pair of electric terminals having a fixed phase relationship to the voltage induced in the other single-phase winding, and voltage transforming means including a single control member to vary the absolute amplitudes of both terminal voltages simultaneously by equal ratios.

HAROLD A. PETERSON.

No references cited.